Oct. 15, 1968  H. L. FOX  3,405,725
FLUID FLOW DIVIDING MEANS FOR FLUID CONTROL DEVICES
Filed March 24, 1964  2 Sheets-Sheet 1
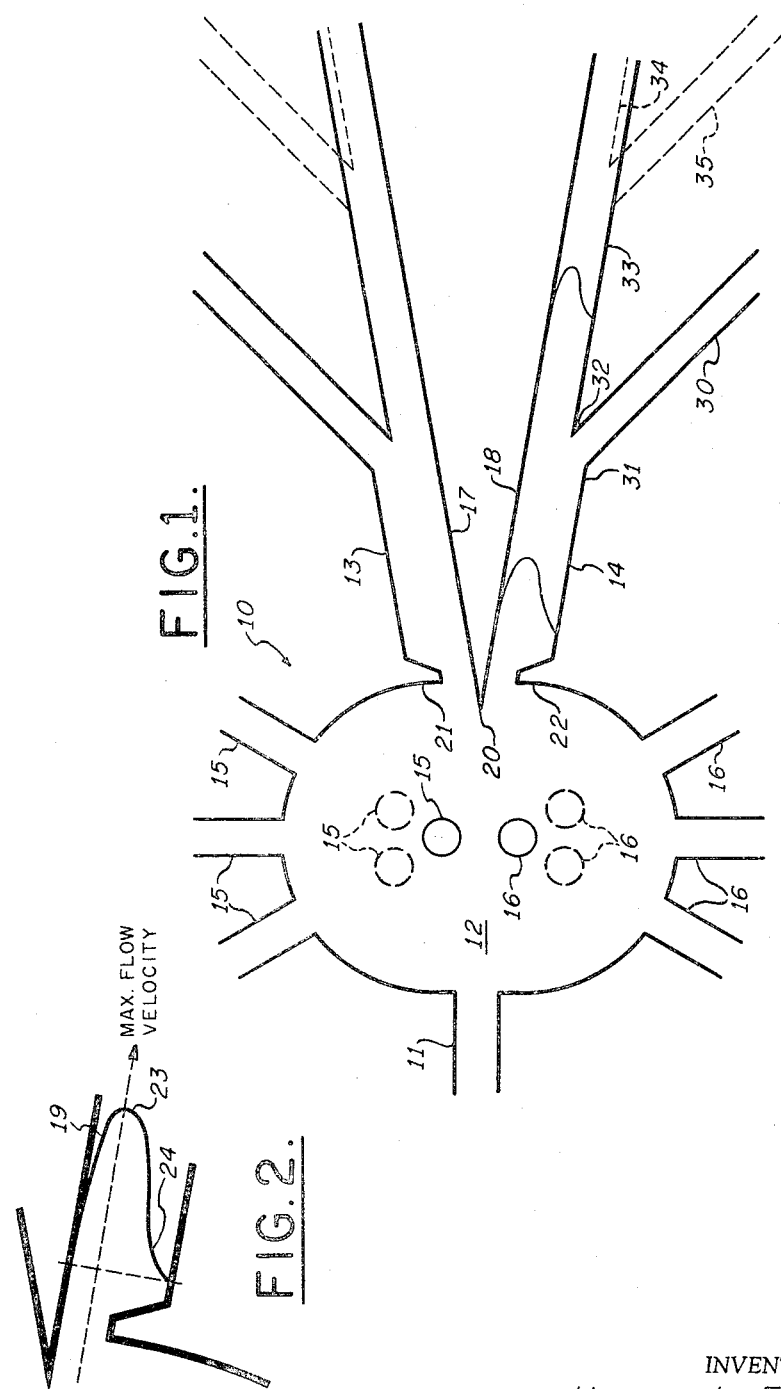
INVENTOR.
HAROLD L. FOX
BY
*H P Terry*
ATTORNEY

INVENTOR.
HAROLD L. FOX
BY
ATTORNEY

United States Patent Office 3,405,725
Patented Oct. 15, 1968

3,405,725
FLUID FLOW DIVIDING MEANS FOR FLUID CONTROL DEVICES
Harold L. Fox, Salt Lake City, Utah, assignor to Sperry Rand Corporation, Great Neck, N.Y., a corporation of Delaware
Filed Mar. 24, 1964, Ser. No. 354,348
2 Claims. (Cl. 137—81.5)

ABSTRACT OF THE DISCLOSURE

Apparatus for enhancing the low velocity portion of the flow velocity profile in a fluid logic device for dividing fluid flow without causing undesirable side effects.

---

The present invention relates to means for dividing fluid flow particularly in pure fluid logic devices without causing a disturbing back pressure or back loading with respect to the operation of the pure fluid logic device.

Pure fluid logic devices also known as fluid amplifiers have no moving parts except the operation fluid. They are arranged generally to form a system of interconnected fluid channels so disposed that a fluid power stream may be switched from one output channel to another by means of one or more fluid control streams, each having less energy than the power stream.

Pure fluid amplifiers are of two general types, namely momentum exchange amplifiers and boundary layer control amplifiers. In a momentum exchange amplifier, a control stream is directed against the side of the power stream and deflects the power stream away from the control stream. The power stream flows at an angle with respect to its original direction, the tangent of this angle being a function of the momentum of the control stream and the original momentum of the power stream. Thus it is possible to selectively deflect the power stream to one or more target areas or outlet channels where it may perform a work function.

In boundary layer control amplifiers, the power stream is directed to a target area or outlet channel by the pressure distribution in the boundary layer region of the power stream. This pressure distribution is controlled by the wall configuration of the interaction chamber, the energy level of the power stream, the fluid transport characteristics, the back loading of the output channels and the flow of control fluid into the boundary layer region. The selective deflection of the power stream into one outlet channel or the other is controlled by introducing control fluid into the boundary layer of the power stream. As a result of the change in pressure distribution in the power stream and its boundary layer, the power stream is caused to switch to the other outlet channel. The configuration of the interaction chamber may be designed such that the power stream becomes locked to a side wall and remains locked thereto even though the flow of control fluid has been terminated. Since accordingly, information may be introduced into the device at a certain moment and extracted at a later moment, the device has memory properties and may be used, for example, as a memory or storage unit in fluid data processors.

Fluid amplifiers of both the momentum exchange and the boundary layer control types are very sensitive to back loading or back pressure. Back loading or back pressure may be defined as the pressure influence on the operation of the amplifier of flow dividing or load devices connected to its output channels. Such back loading causes pressure differences across the power stream, followed by disturbances in the flow pattern of the power stream.

Sensitivity of an amplifier to back loading is usually an undesirable feature. For example, an amplifier sensitive in this respect may switch its output from its back loaded channel to its other channel as soon as the back pressure exceeds a certain level. It will be understood that such an amplifier becomes unstable and cannot be relied on as a storage device. Also, such an amplifier may require a higher level of control energy to ensure reliable switching under load. Further, the pressure disturbances in the power stream may increase the noise level of the device.

A fluid amplifier is designed to perform a certain work function. Usually it is meant to drive a certain load. This load may be a specific device with its specific characteristics or, more often than not, it will be a variety of different devices each having its specific characteristics. It will be appreciated that it should not be necessary to design a different fluid amplifier for every load condition, i.e., for every different load device, number of load devices and their possible interconnection that may occur in operation.

Insensitivity to back loading means that the operation and performance of the fluid device, particularly in the interaction region, is as little as possible influenced by loading conditions.

A further very important consideration with respect to back loading, is the one concerning the particular output parameters. A fluid amplifier, in a particular state, will provide particular pressure-flow characteristics at the output. A unit or units to be fed from this output usually require different characteristics. One or the other of the parameters may have to be largely neglected in such interconnections. However, such an unmatched interconnection generally influences the operation of the driving unit, sometimes, even to the extent of making it inoperative.

Interconnecting one fluid amplifier to another by means of prior art flow dividing devices resulted in undesirable back loading which rendered the upstream unit unreliable or substantially reduced the performance characteristics. Further, prior art interconnecting devices lacked consideration of the fluid flow velocity profiles thereby resulting in improper performance of the upstream connected fluid device as well as the downstream device and in addition unduly limited the number of downstream devices which could be successfully driven by an upstream device.

It is a primary object of the present invention therefore to provide a fluid device having fluid flow dividing means which does not cause disturbing back pressure or undesirable loading effects.

It is an additional object of the present invention to provide a pure fluid logic device having flow dividing means which minimizes undesirable pressure effects on both the upstream and downstream devices.

It is a further object of the present invention to provide a pure fluid logic device having flow dividing means in which the fluid flow velocity profile has been taken into consideration in selecting the type and location of flow dividing means.

The above objects are accomplished in the present invention by providing a fluid flow dividing means in a fluid control device wherein the location of the fluid flow dividing means is arranged in the low velocity portion of said flow velocity profile thereby minimizing undesirable pressure effects. Further, the present invention includes means for enhancing the low velocity portion of the flow velocity profile for purposes of minimizing the undesirable pressure effects.

Other objects and advantages of the present invention will become apparent from the following description taken in conjunction with the drawings in which:

FIG. 1 is a plan view of a fluid logic device incorporating the present invention;

FIG. 2 is an enlarged plan view showing the velocity profile of fluid flow through one output channel of the device of FIG. 1;

Figure 3:
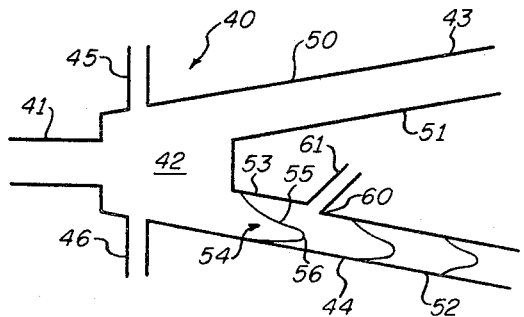
FIG. 3 is a plan view of another embodiment of the present invention.

Referring to FIG. 1, a fluid logic device 10 has an input channel 11 through which a fluid power stream flows into an interaction chamber or cavity 12. Two output channels 13 and 14 communicate with the cavity 12. In addition, two or more control ports 15 and 16 communicate with the cavity 12. The output channels 13 and 14 have inside walls 17 and 18, respectively, which converge at a point 20. Two protuberances or cusps 21 and 22 form a part of the boundary between the cavity 12 and the output channels 13 and 14, respectively. A fluid logic device of this type is disclosed in detail in U.S. patent application No. 352,468, filed Mar. 17, 1964, in the names of H. L. Fox and F. R. Goldschmied, entitled Multi-Mode Fluid Device.

With a power stream introduced into the interaction cavity 12 through the input channel 11, a jet of fluid is established which flows out predominately one of the two output channels 13 and 14. This jet of fluid is a dynamically stable oscillating jet and oscillates between one of the two cusps 21 or 22 and the adjacent wall 17 or 18, respectively. The jet is a dynamic fluid phenomenon but is at the same time stable in that once the jet is attached between one of the cusps 21 or 22 and its adjacent wall, it requires additional energy to cause the jet to switch to the opposite output channel. The power stream input is selectively controlled by the control fluid flowing from one or more of the control ports 15 or 16, as explained in detail in said U.S. patent application No. 352,468. A typical velocity profile 19 of the fluid flow through one of the output channels, for example, 14 is shown in the enlarged view of FIG. 2.

As shown in FIG. 2, the flow velocity profile 19 has a high velocity portion 23 and a low velocity portion 24. Any interference with the high velocity portion will result in back loading upstream and interfere with the switching action within the interaction cavity 12.

In accordance with the present invention, the flow through the output channel 14 may be divided as shown in FIG. 1 without serious disturbance to the upstream flow by means of a flow dividing channel 30 disposed in the outside wall 31 of the output channel 14 having a wedged-shaped barrier 32 which extends into the low velocity portion 24 of the flow velocity profile 19. The amount of flow directed out the flow dividing channel 30 is determined by the spacing between the wall 31 of the output channel 14 and the extent that the wedged-shaped barrier 32 protrudes into the output channel 14.

Downstream of the barrier 32, the walls 18 and 33 of the output channel 14 may be parallel or flared in the form of a diffuser or any other configuration as dictated by design requirements. The flow in the output channel 14 downstream of the flow dividing channel 30 can be further divided by the introduction of another wedged-shaped barrier 34 and flow dividing channel 35 associated therewith, both as shown in dotted lines. The reconstituted flow through the output channel 14 downstream of the barrier 32 will have zero velocity next to the wall 33. The wedged-shaped barrier 34 therefore extends into the output channel 14 adjacent the wall 33 in the low velocity portion of the flow velocity profile 19 in an amount which provides the desired output flow through the flow dividing channel 35 without introducing undesirable disturbance upstream from the barrier 34.

Referring to FIG. 3, another type of fluid logic element 40 is shown having an input channel 41 through which a fluid power stream flows into an interaction chamber or cavity 42. The two output channels 43 and 44 communicate with the cavity 42. In addition two or more control ports 45 and 46 communicate with the cavity 42. The output channels 43 and 44 are divergent with the output channel 43 having an exterior wall 50 and an interior wall 51 while the output channel 44 has an exterior wall 52 and an interior wall 53. A fluid logic element 40 of this type is disclosed in detail in U.S. Patent 3,117,593 entitled "Multi-Frequency Fuid Oscillator" issued Jan. 14, 1964, to E. U. Sowers III.

The flow velocity profile 54 in an output channel, for example, 44 of an element 40 is a function of the configuration of the output channel 44 and the distance downstream from the interaction cavity 42. FIG. 3 shows the flow velocity profile 54 and how it varies for a uniform straight output channel 44 leading from an element 40. The flow velocity profile 54 is skewed as it emerges from the interaction cavity 42 in an opposite sense with respect to that shown in FIG. 1 with respect to the fluid logic device 10 such that the low velocity portion 55 of the flow velocity profile 54 is adjacent the interior wall 53 while its high velocity portion 56 is adjacent the exterior wall 52. Further downstream the profile 54 becomes symmetrical. Therefore, it is desirable with the element 40 shown in FIG. 3 to locate the wedged-shaped barrier 60 of a flow dividing channel 61 adjacent the low velocity portion 55 of the profile 54 on the interior wall 53 of the outlet channel 44 to minimize the upstream disturbance created by the wedged-shaped barrier 60. Thus, the flow dividing channel 61 would be located on the opposite side of the outlet duct 44 for an element 40 than it would be for the element 10 shown in FIG. 1.

For a uniform straight output channel, for example, 44, the skewed velocity profile 54 becomes symmetrical about 10 duct widths downstream from the interaction cavity 42. For this case, the desirable limit at which the wedged-shaped barrier 60 can be located downstream and still be disposed in a low velocity portion 55 of the profile 54 is within the 10 duct width limit.

Figure 4:
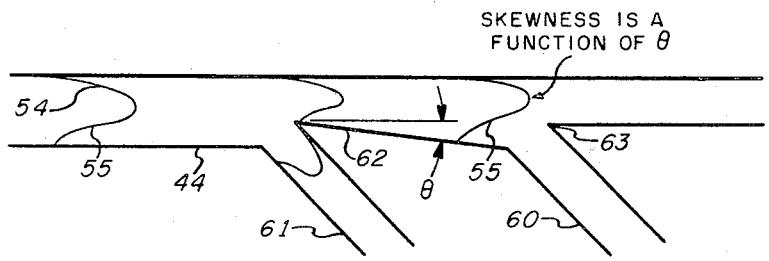
FIG. 4 is an enlarged plan view showing one method of developing an asymmetric flow velocity profile.

Referring now to FIG. 4, if it is desired to enhance the low velocity portion 55 of a profile 54 either because the flow dividing channel is to be disposed more than 10 duct widths downstream from the interaction region 42 as shown in FIG. 3 or as shown in FIG. 4, a second flow dividing channel 60 is arranged downstream from a first flow dividing channel 61, the wall 62 between the two channels 60 and 61 may be flared through a desired angle $\theta$. This will cause the low velocity portion 55 of the profile 54 to be enhanced or skewed in order that the wedged-shaped barrier 63 associated with the flow dividing channel 60 will extend only into the low velocity portion 55 of the profile 54. The skewness or enhancement of the low velocity portion 55 of profile 54 is a function of the flare angle $\theta$ of the wall 62.

Figure 5:
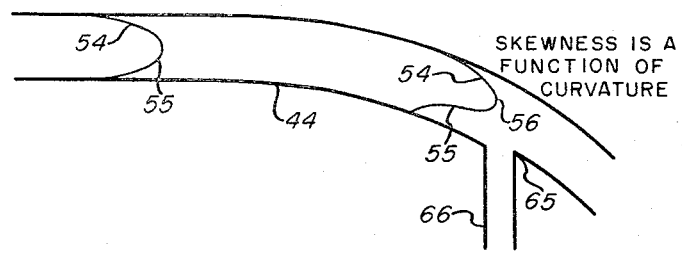
FIG. 5 is an enlarged plan view showing another method of developing asymmetric flow velocity profile.

FIG. 5 shows another method of enhancing the low velocity portion 55 of a profile 54. This is accomplished by curving the output channel 44 in which case the high velocity portion 56 of the profile 54 will tend to be adjacent the portion of the curved outlet channel 44 having the larger radius and the wedged-shaped barrier 65 of the flow dividing channel 66 should then be disposed to extend into the low velocity portion 55 adjacent the wall of the outlet channel 44 having the smaller radius.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. In a fluid logic device,
   (1) a fluid interaction region,
   (2) a pair of outlet channels defined by inside walls which converge at a point within said interaction region and outside walls in fluid communication with said interaction region, (3) a protuberance extending from each of said outside walls towards the adjacent inside wall and forming a portion of said interaction region to provide an asymmetrical flow velocity profile having an enhanced low velocity portion for a predetermined flow condition through each of said outlet channels, and (4) flow dividing means in fluid communication with at least one of said outlet channels at said enhanced low velocity portion of said velocity profile, said flow dividing means including a wedge-shaped portion extending into said low velocity portion.

2. In a fluid device of the character recited in claim 1 in which said outlet channel is skewed at a predetermined angle upstream of said wedge-shaped portion for accentuating said low velocity portion.

References Cited

UNITED STATES PATENTS

| | | | |
|---|---|---|---|
| 3,223,101 | 12/1965 | Bowles | 137—81.5 |
| 3,103,942 | 9/1963 | Sharp | 137—561 |
| 3,168,897 | 2/1965 | Adams | 137—81.5 |
| 3,171,421 | 3/1965 | Joesting | 137—81.5 |

FOREIGN PATENTS 1,024,100    1/1953    France.

OTHER REFERENCES

Warren, R. W.: Some Parameters Affecting the Design of Bistable Fluid Amplifiers, in Fluid Jet Control Devices, pp. 75–82, Nov. 28, 1962, The American Society of Mechanical Engineers, United Engineering Center, 345 E. 47th St., New York 17, N.Y.

M. CARY NELSON, *Primary Examiner.*

W. R. CLINE, *Assistant Examiner.*